United States Patent
Nakano et al.

(10) Patent No.: US 11,247,696 B2
(45) Date of Patent: Feb. 15, 2022

(54) INFORMATION PROCESSING DEVICE, INFORMATION PROCESSING METHOD, AND RECORDING MEDIUM

(71) Applicant: Panasonic Intellectual Property Management Co., Ltd., Osaka (JP)

(72) Inventors: Toshihisa Nakano, Osaka (JP); Kouji Kobayashi, Kanagawa (JP); Tohru Wakabayashi, Hyogo (JP); Kazuya Fujimura, Nara (JP); Masato Tanabe, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 16/430,375

(22) Filed: Jun. 3, 2019

(65) Prior Publication Data
US 2019/0300011 A1    Oct. 3, 2019

Related U.S. Application Data

(63) Continuation of application No. PCT/JP2017/037438, filed on Oct. 17, 2017.

(30) Foreign Application Priority Data

Mar. 30, 2017 (JP) .............................. JP2017-068587

(51) Int. Cl.
*B60W 50/04* (2006.01)
*G06F 13/20* (2006.01)
(Continued)

(52) U.S. Cl.
CPC .......... *B60W 50/04* (2013.01); *B60R 16/023* (2013.01); *G06F 13/20* (2013.01); *G07C 5/008* (2013.01);
(Continued)

(58) Field of Classification Search
CPC ...... B60W 50/04; B60W 30/06; B60W 30/09; B60W 30/12; B60W 30/16; B60R 16/023;
(Continued)

(56) References Cited

U.S. PATENT DOCUMENTS

| | | |
|---|---|---|
| 2015/0191135 A1 | 7/2015 | Ben Noon et al. |
| 2015/0191136 A1 | 7/2015 | Ben Noon et al. |

(Continued)

FOREIGN PATENT DOCUMENTS

| | | |
|---|---|---|
| JP | 2007-043398 | 2/2007 |
| JP | 2009-181420 | 8/2009 |
| JP | 2015-136107 | 7/2015 |

OTHER PUBLICATIONS

International Search Report of PCT application No. PCT/JP2017/037438 dated Dec. 19, 2017.

*Primary Examiner* — Gertrude Arthur Jeanglaude
(74) *Attorney, Agent, or Firm* — Greenblum & Bernstein, P.L.C.

(57) ABSTRACT

An information processing device collects information used for analyzing communication performed in an in-vehicle network by ECUs including an ECU which performs predetermined control related to a function of an ADAS. The information processing device includes a receiver, a determiner, and a processor. The receiver receives a plurality of items of communication data sequentially transmitted over the in-vehicle network. The determiner detects a control end time which is a time at which the predetermined control ends, and determine an analysis target period including the control end time. The processor classifies the plurality of items of communication data received by the receiver into analysis target communication data received within the analysis target period and non-analysis target communication data received outside the analysis target period. The
(Continued)

processor further performs predetermined processing for analysis of the analysis target communication data based on the classification result.

11 Claims, 11 Drawing Sheets

(51) Int. Cl.
| | |
|---|---|
| *G07C 5/00* | (2006.01) |
| *G07C 5/02* | (2006.01) |
| *H04L 12/40* | (2006.01) |
| *H04L 12/26* | (2006.01) |
| *H04L 29/08* | (2006.01) |
| *B60R 16/023* | (2006.01) |
| *H04L 12/28* | (2006.01) |
| *B60W 30/06* | (2006.01) |
| *B60W 30/09* | (2012.01) |
| *B60W 30/12* | (2020.01) |
| *B60W 30/16* | (2020.01) |
| *G08G 1/16* | (2006.01) |

(52) U.S. Cl.
CPC ............... *G07C 5/02* (2013.01); *H04L 12/28* (2013.01); *H04L 12/40* (2013.01); *H04L 43/04* (2013.01); *H04L 67/12* (2013.01); *B60W 30/06* (2013.01); *B60W 30/09* (2013.01); *B60W 30/12* (2013.01); *B60W 30/16* (2013.01); *G08G 1/16* (2013.01); *H04L 2012/40215* (2013.01)

(58) Field of Classification Search
CPC ........... G06F 13/20; G07C 5/008; G07C 5/02; H04L 12/28; H04L 12/40; H04L 43/04; H04L 67/12; H04L 2012/40215; G08G 1/16
USPC ........................................................ 701/31.4
See application file for complete search history.

(56) References Cited

U.S. PATENT DOCUMENTS

| | | | |
|---|---|---|---|
| 2015/0191151 A1 | 7/2015 | Ben Noon et al. | |
| 2015/0195297 A1 | 7/2015 | Ben Noon et al. | |
| 2016/0381068 A1* | 12/2016 | Galula | ............... H04L 63/123 |
| | | | 726/23 |
| 2017/0212513 A1* | 7/2017 | Iida | ..................... B60Q 9/00 |

* cited by examiner

FIG. 2

| SOF | ID field | RTR | IDE | r | DLC | Data field | CRC | DEL | ACK | DEL | EOF |

FIG. 6

(Buffer content)

| Reception time information | Communication data | |
|---|---|---|
| Timestamp (milliseconds) | Message ID | Data |
| 3 | 0x103 | 0x1234 |
| 15 | 0x73E | 0x2B500002 |
| 21 | 0x011 | 0x0055 |
| 36 | 0x3B1 | 0x33A21000... |
| ⋮ | ⋮ | ⋮ |
| 221 | 0x011 | 0xFFFF |
| ⋮ | ⋮ | ⋮ |

FIG. 8

| ADAS function type | Control type | Communication data | | Validity determination |
|---|---|---|---|---|
| | | Message ID | Data type | |
| Lane keep assistance function | Automatic steering | 0x011 | Steering angle | (Data value)<br>0xFFFF : Invalid<br>Other than above : Valid |
| Parking assistance function | Automatic parking | 0x041 | Steering angle | |
| Collision avoidance assistance function | Emergency brake | 0x021 | Braking level | |
| Preceding vehicle follow assistance function | Accelerate | 0x031 | Acceleration amount | |
| | Decelerate | 0x032 | Deceleration amount | |

FIG. 9

Analysis target time period table

| ADAS function type | Analysis target period (seconds) |
|---|---|
| Lane keep assistance function | 60 |
| Parking assistance function | 30 |
| Collision avoidance assistance function | 10 |
| Preceding vehicle follow assistance function | 60 |

INFORMATION PROCESSING DEVICE, INFORMATION PROCESSING METHOD, AND RECORDING MEDIUM

CROSS-REFERENCE TO RELATED APPLICATIONS

This application is a continuation of the PCT International Application No. PCT/JP2017/037438 filed on Oct. 17, 2017, which claims the benefit of foreign priority of Japanese patent application No. 2017-068587 filed on Mar. 30, 2017, the contents all of which are incorporated herein by reference.

BACKGROUND

1. Technical Field

The present disclosure relates to a technique for analyzing communication performed between electronic control units in a vehicle.

2. Description of the Related Art

In recent years, an automobile includes a plurality of electronic control units (ECUs). The ECUs form a communication network, referred to as an in-vehicle network, for controlling the automobile. The ECUs perform communication via a bus which is a transmission path in accordance with, for example, the Controller Area Network (CAN) standard defined by ISO11898.

An ECU serving as a transmission node transmits a frame as a message with an identifier (ID, also referred to as a message ID), and each ECU serving as a receiving node receives a frame with an ID predetermined for the each ECU.

Moreover, an Advanced Driver Assistance System (ADAS) is known. In the functions of the ADAS (such as a parking assistance function, a lane keep assistance function, and a collision avoidance assistance function), for example, information obtained by a sensor connected to the in-vehicle network, that is, an image captured by an in-vehicle camera, and information obtained by Light Detection and Ranging (LIDAR) are used so that the ECUs recognize the environment surrounding the automobile based on the obtained information and control the automobile in accordance with the recognition result. For example, as an automatic steering function which is one of the collision avoidance assistance functions, a plurality of ECUs are linked to control a steering device so that a collision with the obstacle detected on the road is avoided.

As a conventional technique related to the security of the in-vehicle network, a technique is known in which a module connected to the bus of the in-vehicle network accumulates data related to the monitored messages and transmits the accumulated data to the hub (see Japanese Patent Unexamined Publication No. 2015-136107).

SUMMARY

For progress in automatic driving techniques including ADAS, securing security, and the like, with respect to vehicles such as automobiles, it is beneficial to collect information related to the communication performed between the ECUs and perform various kinds of analysis such as verification of whether or not control related to the ADAS function has been appropriately performed.

However, the ECUs transmit and receive a large number of messages via the bus in accordance with the CAN. Hence, performing processing for analysis on all the messages communicated via the bus requires a large amount of calculation resources, storage capacity, and resources such as communication bands.

The present disclosure provides an information processing device which is capable of efficiently performing processing for analysis of the communication performed in a vehicle. The present disclosure also provides an information processing method, a program, and a recording medium storing the program which are used in the information processing device.

An information processing device according to one aspect of the present disclosure collects information used for analyzing communication performed between a plurality of ECUs in an in-vehicle network. The plurality of ECUs include an ECU which performs, on a vehicle, control related to a function of the ADAS. The information processing device includes a receiver, a determiner, and a processor. The receiver receives a plurality of items of communication data sequentially transmitted over the in-vehicle network. The determiner detects control end time which is the time at which the control ends and determines an analysis target period including the control end time. The processor classifies the plurality of items of communication data received by the receiver into analysis target communication data received within the analysis target period and non-analysis target communication data received outside the analysis target period. The processor further performs predetermined processing for analysis of the analysis target communication data based on the classification result.

An information processing method according to one aspect of the present disclosure is used in the information processing device installed in the vehicle. The information processing device collects information used for analyzing communication performed between a plurality of ECUs in an in-vehicle network. The plurality of ECUs include an ECU which performs, on a vehicle, control related to a function of the ADAS. In the information processing method, first, a plurality of items of communication data sequentially transmitted over the in-vehicle network are received. Next, control end time which is the time at which the control ends is detected and an analysis target period including the control end time is determined. The plurality of items of communication data received are classified into analysis target communication data received within the analysis target period and non-analysis target communication data received outside the analysis target period. Furthermore, predetermined processing for analysis of the analysis target communication data is performed based on the classification result.

A program according to one aspect of the present disclosure causes the information processing device installed in the vehicle and including a microprocessor to perform information processing. The information processing device collects information used for analyzing communication performed between a plurality of ECUs in an in-vehicle network. The plurality of ECUs include an ECU which performs, on a vehicle, control related to a function of the ADAS. The program includes receiving, determining, classifying, and performing. In the receiving, a plurality of items of communication data sequentially transmitted over the in-vehicle network are received. In the determining, the control end time which is time at which the control ends is detected and an analysis target period including the control end time is determine. In the classifying, the plurality of items of communication data received are classified into analysis target communication data received within the analysis target period and non-analysis target communication data received outside the analysis target period. In the performing, predetermined processing for analysis of the analysis target communication data is performed based on the classification result.

These general or specific aspects may be realized as a system, a method, an integrated circuit, a computer program, or a computer readable recording medium such as a CD-ROM, or any given combination of the systems, methods, integrated circuits, computer programs or recording media. In other words, a non-transitory recording medium according to one aspect of the present disclosure stores the above program.

According to the present disclosure, it is possible to efficiently perform processing for analysis of the communication performed in the vehicle.

BRIEF DESCRIPTION OF DRAWINGS

FIG. 2 is a diagram illustrating the format of a data frame specified in the CAN protocol.

FIG. 6 is a diagram illustrating an example of content of a buffer of the information processing device according to the first exemplary embodiment.

FIG. 8 is a diagram illustrating examples of content of communication data transmitted by ECUs for predetermined control.

FIG. 9 illustrates an example of an analysis target time period table used by the information processing device according to the first exemplary embodiment.

Figure 1:
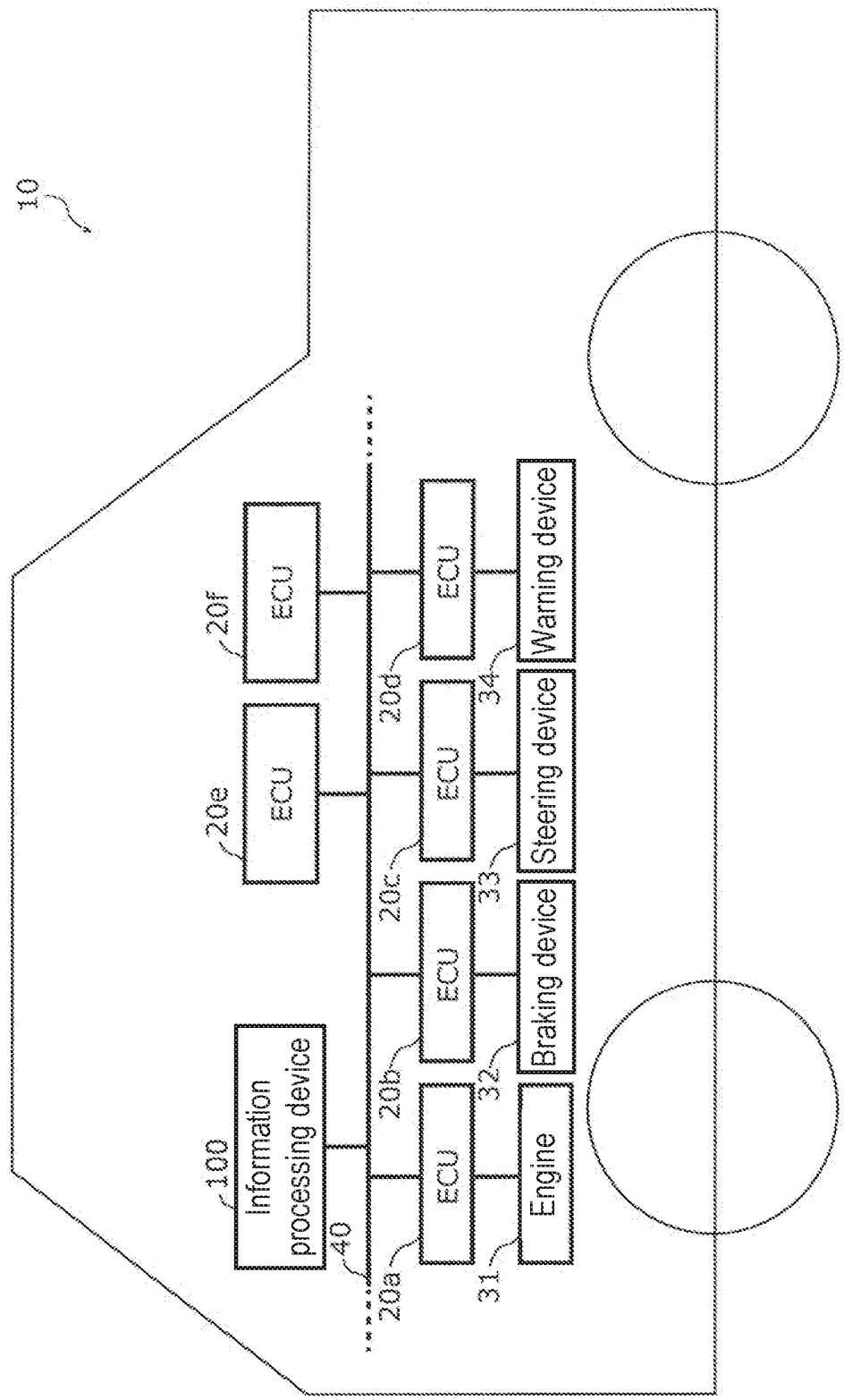
FIG. 1 is a diagram illustrating an overall configuration of an in-vehicle network system according to a first exemplary embodiment.

DETAILED DESCRIPTION OF PREFERRED EMBODIMENTS (Underlying Knowledge and the like Forming Basis of the Present Disclosure)

In an in-vehicle network system in which electronic control units (ECUs) installed in a vehicle (such as an automobile) transmit and receive messages via a bus in accordance with the CAN protocol, a large number of messages are communicated via the bus. By collecting and analyzing information, such as the vehicle state and control details related to the traveling of the vehicle, indicated in the messages, for example, it is possible to verify whether or not control related to the ADAS function has been appropriately performed, and to assess the matters to be improved.

Moreover, by collecting and analyzing information related to the messages, for example, it is possible to detect attacks, such as transmission of improper messages by an attacker, and to establish a method for determining whether or not an attack has occurred. An attacker is, for example, a person who attempts to control a vehicle against the driver's will by illegally controlling the ADAS by a cyber attack or the like against the in-vehicle network.

Moreover, for the progress in automatic driving techniques including ADAS, securing security, and the like, it is also beneficial to collect and analyze information related to the messages transmitted and received over in-vehicle networks in the same type of vehicles.

An example will be described where a server device managed by a vehicle manufacturer (automaker) or the like has a function of analyzing messages to promptly realize security measures against a new attack on a vehicle with an automatic driving function.

Each vehicle manufactured by an automaker promptly transmits information of messages communicated over the in-vehicle network sequentially to the server device. The server device performs various types of analysis based on the received information. Examples of the details of analysis include recognition of type, cycle, and frequency of the messages communicated over the in-vehicle network, and recognition of various matters such as the vehicle state, and control details indicated by the messages. The automaker and the like can take measures against new attacks based on the result of the analysis.

In order that a vehicle promptly transmits information related to all the messages communicated via the bus of the in-vehicle network to a server device or the like for analysis, a communication band of, for example, approximately 500 kbps is required per vehicle. However, in the situation where a large number of vehicles communicate with the server device or the like, such as at the time of heavy traffic, an extremely large communication band is required. Securing resources for such large communication bands is not necessarily easy.

In view of the above, in order to reduce the amount of resources, such as communication bands required for analyzing information related to the messages communicated via the bus of the in-vehicle network, the inventors of the present disclosure have achieved a technique for efficiently performing processing for analysis, such as transmission, where the processing target is narrowed down.

In the information processing method according to the above technique, specifically, when control related to the ADAS function has been performed in a vehicle, the period, such as a few seconds or several tens of seconds, including the time at which the control has ended, is determined as an analysis target period, and processing for analysis of messages is performed while limiting the analysis target to the messages received in the analysis target period.

The information related to the messages communicated via the bus when control related to the ADAS function is performed in the vehicle is of high importance in view of, for example, verification of the ADAS functions or security measures. Accordingly, in the information processing method, the period from a time when predetermined control related to the ADAS function is performed in a vehicle to a time when the predetermined control ends is determined as the period during which important communication is performed between the ECUs, and the period is used for determining the analysis target period. The predetermined control related to the ADAS function is, for example, control of an actuator in the vehicle related to a function such as a parking assistance function, a lane keep assistance function, a collision avoidance assistance function, and a preceding vehicle follow assistance function. As described above, the ADAS includes so-called Parking System, Lane Keeping Assist System, Collision Avoidance System, and Adaptive Cruise Control System, for example.

Hence, it is possible to suppress an increase in resources required for processing for analysis of messages. Examples of the resources of which increase can be suppressed include a communication band used for transmitting information from a vehicle to a server device, the capacity of a recording medium (or a storage medium) for holding information in the vehicle or the server device, and computational resources used for various types of operations related to analysis in the vehicle or the server device. For example, by installing the information processing device which performs the information processing method in a vehicle, it is possible to efficiently perform processing for analysis of communication performed in the vehicle.

An object of the analysis may be other than rapid implementation of security measures against new attacks as in the above example. Various objects can be set for progress in automatic driving techniques including ADAS, and securing security. Accordingly, the vehicle does not always have to sequentially transmit, to an external server device or the like, information related to the messages communicated via the bus of the in-vehicle network in order to analyze the information.

For example, the vehicle may accumulate information related to the messages communicated via the bus on a recording medium mounted in the vehicle, without transmitting the information. In such a case, for example, by connecting an external tool or the like to the vehicle at some point to read the information from the recording medium, or by removing the recording medium from the vehicle, it is possible to use the information accumulated in the recording medium for analysis in a device, such as a computer, external to the vehicle. Moreover, a device in the vehicle may collect and analyze information related to the messages communicated via the bus.

In any cases, according to the information processing method, it is efficient to perform processing for analysis, such as transmission or recording on the recording medium, only on the messages received from the bus within the analysis target period determined based on the end of the predetermined control related to the ADAS function. It provides an advantageous effect of reducing the amount of resources required for the processing for analysis. The information processing method can be performed by an information processing device installed in a vehicle, for example.

Hereinafter, an in-vehicle network system including an information processing device which uses an information processing method according to exemplary embodiments will be described with reference to the drawings. Note that each of the exemplary embodiments described below shows a specific example of the present disclosure. The numerical values, structural components, the arrangement and connection of the structural components, steps, and the order of the steps indicated in the following embodiments are mere examples, and therefore do not intend to limit the present disclosure. Therefore, among the structural components in the following embodiments, those not recited in any of the independent claims are described as optional structural components. Note that the drawings are represented schematically and are not necessarily precise illustrations.

First Exemplary Embodiment

[1.1 Overall Configuration of In-vehicle Network System 10]

FIG. 1 is a diagram illustrating an overall configuration of in-vehicle network system 10 according to a first exemplary embodiment.

In-vehicle network system 10 is an example of a network communication system which performs communication in accordance with the CAN protocol, and includes an in-vehicle network in a vehicle. A vehicle is, for example, an automobile, and various types of devices such as actuators, control devices, and sensors are installed in the vehicle.

In-vehicle network system 10 includes bus 40, information processing device 100, ECUs 20a to 20f, engine 31, braking device 32, steering device 33, and warning device 34. Although not illustrated in FIG. 1, in-vehicle network system 10 can include a plurality of ECUs in addition to ECUs 20a to 20f. However, descriptions will be given here mainly on ECUs 20a to 20f for the purpose of convenience.

Each ECU is a device which includes, as a hardware configuration, for example, a processor (i.e. a microprocessor), a digital circuit such as a memory, an analog circuit, and a communication circuit. The memory is, for example, a read-only memory (ROM) or a random access memory (RAM), and is capable of storing a program (that is a computer program) executed by the processor. Each ECU achieves, for example, various functions for control of the vehicle as a result of the processor operating in accordance with the program. The program is configured of a combination of a plurality of instruction codes indicating instructions to the processer in order to achieve predetermined functions.

Each ECU is connected to bus 40 to form the in-vehicle network. Each ECU can be connected to devices such as an actuator, a control device, and a sensor. In the example of FIG. 1, ECUs 20a to 20d are respectively connected to engine 31, braking device 32, steering device 33, and warning device 34.

The rotational speed of engine 31 is controlled by, for example, opening and closing of a throttle valve in response to an operation of an accelerator pedal. For example, in braking device 32, a brake actuator is controlled in response to an operation of a brake pedal to reduce the speed of the vehicle. For example, in steering device 33, a steering angle actuator is controlled in response to an operation of a steering wheel so that the direction of travel, that is, the direction of movement of the vehicle is changed. Warning device 34 is, for example, a device which controls lighting of an emergency flashing indicator lamp to perform notification to the outside the vehicle, and may be a device which controls sounding of a horn.

Each ECU transmits and receives messages via bus 40 in accordance with the CAN protocol. For example, the ECU connected to the sensor periodically transmits, to bus 40, messages each including data which is based on the information obtained by the sensor. The message transmission cycle is, for example, several hundred milliseconds. Moreover, the ECU connected to the actuator in the vehicle determines control details of the actuator based on the message received from bus 40 and controls the actuator.

ECU 20e and ECU 20f are responsible for control related to the ADAS functions. For example, ECU 20e performs control for the parking assistance function, and ECU 20f performs automatic steering control for the lane keep assistance function. For example, ECU 20e detects that an operation for instructing the activation of the parking assistance function has been performed by an occupant of the vehicle, and activates the parking assistance function. ECU 20e then determines the control details for the parking assistance function according to the state of the vehicle, and transmits various types of messages indicating the determined control to bus 40.

For example, ECU 20f receives a message including information obtained by the sensor from bus 40, and detects, based on the information, an angle formed by white or yellow lines on the road surface and the traveling direction of the vehicle. ECU 20f then determines instruction information such as steering angle for automatic steering according to the detected angle, and transmits a message indicating the instruction information of the steering angle and the like to bus 40. The message indicating the instruction information has a predetermined message ID so that ECU 20c receives the message and controls steering device 33 according to the instruction information. A plurality of other ECUs which perform control for achieving respective ADAS functions may be present in addition to ECU 20e and ECU 20f. For example, an ECU which performs control for the collision avoidance assistance function, and an ECU which performs control for the preceding vehicle follow assistance function may be connected to bus 40.

Information processing device 100 performs processing for collecting and analyzing information related to the communication data transmitted and received by ECUs 20a to 20f. Information processing device 100 includes a hardware similar to those of ECUs 20a to 20f, for example, and receives messages from bus 40 in accordance with the CAN protocol. Information processing device 100 has a function of narrowing down the processing target by classifying communication data included in the messages received from bus 40 into communication data targeted for processing for analysis and other communication data.

Information processing device 100 also has an external communication function of communicating with a device external to the vehicle via a wide area network, such as the Internet. Information processing device 100 transmits, to the external server device having an analyzing function, information which is based on the communication data narrowed down as the processing target among the communication data received from bus 40. The server device is, for example, a computer which receives information related to messages transmitted and received over each in-vehicle network of the same type of vehicles, from each of the vehicles, and collects and analyzes the information.

In in-vehicle network system 10, respective ECUs transmit and receive frames, such as data frames, as messages in accordance with the CAN protocol. Each of the frames in the CAN protocol includes a data frame, a remote frame, an overload frame, and an error frame. Here, the data frame as the message including the communication data will be mainly described.

[1.2 Data Frame Format]

Hereinafter, a data frame, which is one of the frames used in a network in accordance with the CAN protocol, will be described.

Figure 2:
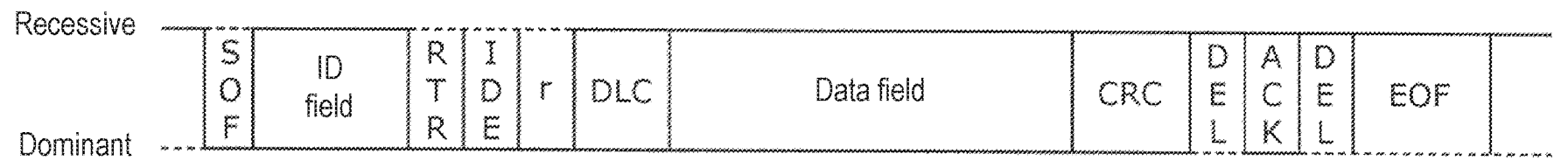

FIG. 2 is a diagram illustrating the format of a data frame specified in the CAN protocol. FIG. 2 illustrates a data frame in a standard ID format specified in the CAN protocol. The data frame includes the following fields: a Start of Frame (SOF), an ID field, a Remote Transmission Request (RTR), an Identifier Extension (IDE), a reserved bit "r", a Data Length Code (DLC), a data field, a Cyclic Redundancy Check (CRC) sequence, a CRC delimiter "DEL", an Acknowledgement (ACK) slot, an ACK delimiter "DEL", and an End of Frame (EOF).

The ID field is an 11-bit field storing an ID (also referred to as message ID) which is a value indicating the type of data. In order to conduct communication arbitration by the ID field when a plurality of nodes start transmission at the same time, the ID field is designed so that a frame having a less value has a higher priority.

The data field is made up of a maximum of 64 bits, and is a field storing data.

Each ECU, which transmits a message, stores a kind of data predetermined as the specification of in-vehicle network system 10 in the data field, and stores a predetermined message ID corresponding to the kind of data in the ID field. Thereby, each ECU forms and transmits a data frame. As the specification of in-vehicle network system 10, for example, a message ID used for a message, and a corresponding data structure are predetermined by the vehicle manufacturer or the like.

[1.3 Configuration of Information Processing Device 100]

Figure 3:
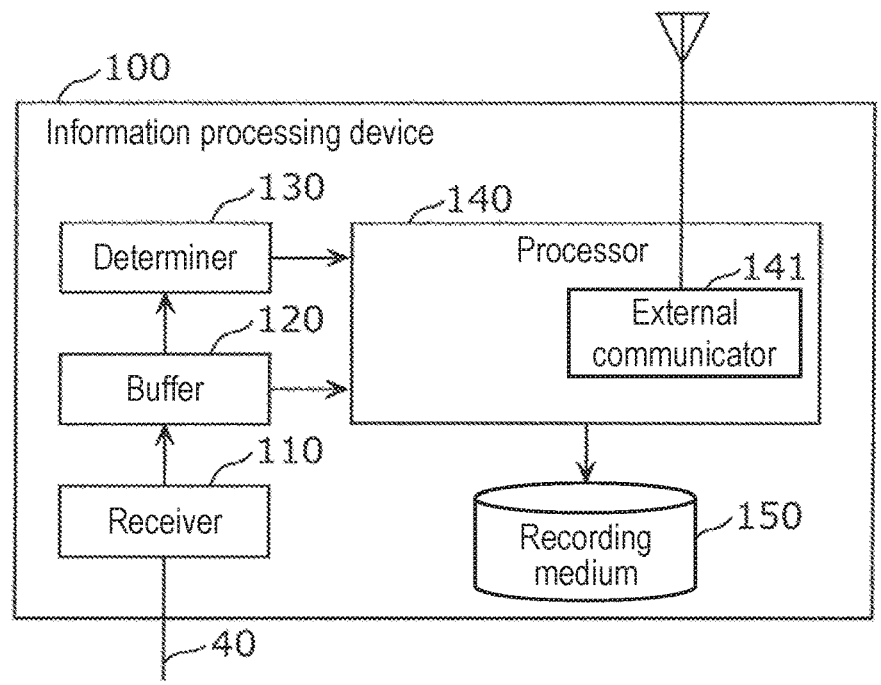
FIG. 3 is a functional block diagram of an information processing device according to the first exemplary embodiment.

FIG. 3 is a functional block diagram illustrating a configuration of information processing device 100. As illustrated in FIG. 3, information processing device 100 includes receiver 110, buffer 120, determiner 130, processor 140, and recording medium 150. Processor 140 includes external communicator 141.

Figure 4:
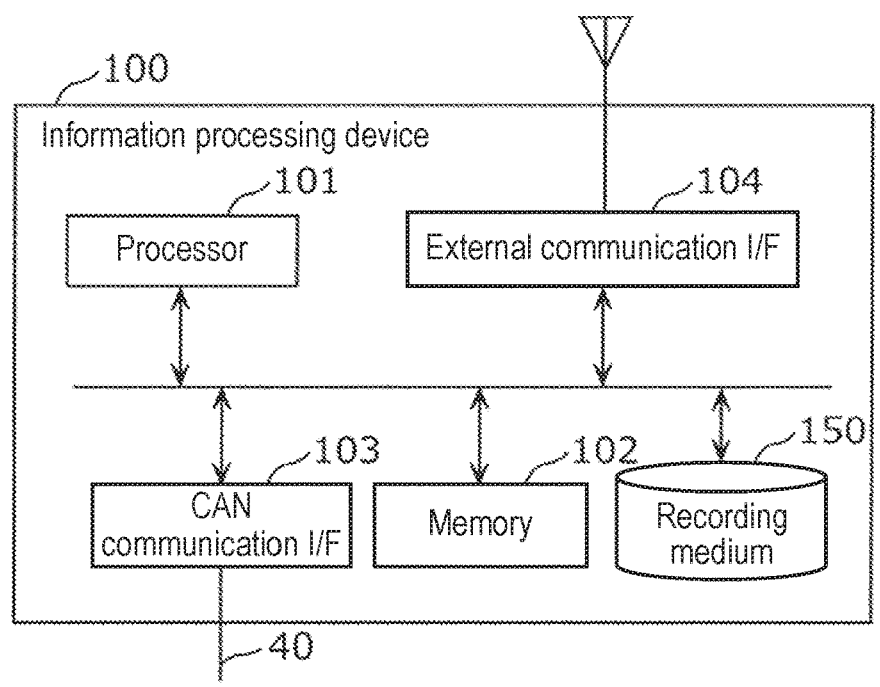
FIG. 4 is a diagram illustrating an example of a hardware configuration of the information processing device according to the first exemplary embodiment.

In addition to the hardware configuration of the ECU, information processing device 100 includes, as a hardware configuration, a communication circuit for communicating with recording medium 150 and a device external to the vehicle. FIG. 4 illustrates an example of a hardware configuration of information processing device 100. In the example of FIG. 4, information processing device 100 includes, as a hardware configuration, processor (microprocessor) 101, memory 102, CAN communication I/F (interface) 103, external communication I/F 104, and recording medium 150.

Memory 102 is, for example, a ROM or a RAM, and is capable of storing a program executed by processor 101. Memory 102 may include a non-volatile memory. For example, information processing device 100 achieves various functions, as a result of operation of processor 101 in accordance with a program for predetermined information processing and the like stored in memory 102. CAN communication I/F 103 is a communication circuit, such as a CAN controller, for performing communication in accordance with the CAN protocol. External communication I/F 104 is, for example, a wireless communication circuit for communicating with a network external to the vehicle. Recording medium 150 is, for example, a non-volatile memory, such as a memory card, or a hard disk.

Receiver 110 is realized by, for example, CAN communication I/F 103, processor 101 which executes a program, and the like. Receiver 110 sequentially receives, from bus 40, communication data related to communication performed between the ECUs, and stores the data in buffer 120. The communication data received by receiver 110 is included in a message, that is, in a data frame communicated via bus 40. Here, the communication data may include, for example, the content of the data field of the data frame, and may additionally include the other information in the data frame such as a message ID.

Moreover, receiver 110 may receive all the messages communicated over bus 40, or may receive only messages each having a specific message ID, that is, messages each having ID field content which satisfies a specific condition. The message having the ID field content which satisfies the specific condition is, for example, a message having a message ID which is included in a reception ID list. For example, receiver 110 receives a plurality of messages including, in the data field, a type of communication data corresponding to a specific message ID by using the reception ID list.

In the reception ID, message IDs of messages are listed. The messages include a type of communication data which is useful as an analysis target, as the data field content. Examples of the type of communication data which is useful as the analysis target include the vehicle speed, a position of a derailleur, an angular velocity of an axle, a position of an accelerator pedal, a rotational speed of the engine, a driver request torque, a maximum torque of the engine, a fuel consumption rate, a position of the throttle valve, a braking level, a steering angle, a lateral acceleration, and a yaw rate.

Buffer 120 is configured from a storage medium, and is configured of, for example, a region of memory 102. Buffer 120 at least temporarily stores the communication data received by receiver 110. For example, each time receiver 110 receives a message including communication data from bus 40, receiver 110 treats the received communication data as a target for storage in buffer 120. When buffer 120 has a free space, receiver 110 stores the storage target communication data in buffer 120. When buffer 120 has no free space, for example, receiver 110 sequentially overwrites, with the storage target communication data, the communication data stored in buffer 120 in the order from the earliest stored communication data. Receiver 110 stores the received communication data in buffer 120 after adding, to the received communication data, reception time information which indicates the time of reception of the communication data.

Determiner 130 is realized by, for example, processor 101 which executes a program. Determiner 130 detects control end time and determines an analysis target period including the control end time. The control end time is the time at which predetermined control related to the ADAS function performed by an ECU, such as ECU20e or ECU 20f, has ended. The predetermined control is, for example, control of one or more actuators related to the execution of the ADAS function. The predetermined control may be control of a steering angle actuator or a brake actuator mounted in the vehicle.

Determiner 130 may detect the control end time of the predetermined control by any method. For example, determiner 130 detects the control end time by referring to the communication data received from bus 40. For example, a message including communication data which indicates the end of the predetermined control is transmitted from the ECU which controls the vehicle in relation to the ADAS function. Determiner 130 then repeats checking the content of buffer 120. When determiner 130 confirms that the communication data which indicates the end of the predetermined control is stored in buffer 120, determiner 130 determines, as the control end time, the time at which the confirmation is made or the time at which receiver 110 receives the communication data.

Determiner 130, for example, detects the control end time of the predetermined control, based on the communication data received by receiver 110, and determines the analysis target period so as to include the period from the time at which a predetermined condition is satisfied before the control end time to the control end time.

Determiner 130 determines the analysis target period by, for example, determining the time at which a predetermined condition is satisfied, based on the communication data and the reception time information stored in buffer 120. The predetermined condition is satisfied, for example, before the control end time by a predetermined period (for example, a few seconds). The control end time is the time of the end of predetermined control related to a specific function among various ADAS functions. The predetermined period may be a time period selected for the specific function among predetermined periods set for various ADAS functions.

Moreover, the predetermined condition may be satisfied, for example, when a certain amount of communication data starts to be received from bus 40 before the control end time. Moreover, the predetermined condition may be satisfied when the vehicle stops immediately before the control end time. Moreover, the predetermined condition may be satisfied when a message indicating predetermined information is received from bus 40 immediately before the control end time. As a specific example, determiner 130 determines the analysis target period so that the control end time of predetermined control is the end of the analysis target period and the time at which a predetermined condition is satisfied before the control end time is the start of the analysis target period.

Moreover, determiner 130 may detect the control start time at which predetermined control starts, based on the communication data and the reception time information stored in buffer 120, and determine the control start time as the time at which the predetermined condition is satisfied. Moreover, determiner 130 may detect a predetermined operation time based on the communication data and the reception time information stored in buffer 120, and determine the predetermined operation time as the time at which the predetermined condition is satisfied. The predetermined operation time is the time at which an occupant of the vehicle performs a predetermined operation on the vehicle.

For example, when the predetermined control is defined as the control of an actuator for the parking assistance function, the predetermined operation may be an operation of an operating interface for instructing activation of the parking assistance function (such as pressing the automatic parking start button). When the predetermined operation is performed, the vehicle operations in response to the predetermined operation. The predetermined operation may be, for example, an operation of breaking device 32 such as stepping on the breaking pedal, or an operation of steering device 33 such as steering the steering wheel. Moreover, the predetermined operation may be, for example, an operation of an operating interface for warning device 34 or the like, an operation of an operating interface for turning on hazard flusher, or an operation of an operating interface for beeping a horn.

The analysis target period determined by determiner 130 is used by processor 140 to classify communication data into communication data targeted for processing for analysis and communication data not targeted for processing for analysis.

Processor 140 includes external communicator 141 which communicates with, for example, a server device which is a device external to the vehicle. Processor 140 is realized by, for example, processor 101 which executes a program, and external communication I/F 104.

Processor 140 classifies the communication data received by receiver 110 and stored in buffer 120 into analysis target communication data which is communication data received within the analysis target period determined by determiner 130, and non-analysis target communication data which is communication data received outside the analysis target period. Processor 140 then performs predetermined processing for analysis of the analysis target communication data based on the classification result. The start and the end of the analysis target period are included in the analysis target period. The predetermined processing for analysis is analyzing processing or processing which is useful for analysis, and is predetermined processing performed where the analysis target communication data is distinguished from the non-analysis target communication data.

For example, processor 140 performs predetermined processing for analysis in order to cause the external server device to analyze the analysis target communication data. More specifically, processor 140 causes external communicator 141 to transmit analysis information to the server device. The analysis information to be transmitted includes analysis target communication data and excludes non-analysis target communication data among the communication data received by receiver 110 and stored in buffer 120.

The analysis information is used for analyzing the analysis target communication data, and is, for example, a so-called communication log. The analysis information may further include, in addition to the content of the analysis target communication data, for example, reception time information which indicates the time at which receiver 110 received the analysis target communication data, and information which indicates the frequency of the receptions of the analysis target communication data. Moreover, the analysis information may include information such as a message ID included in the message which includes the analysis target communication data received by receiver 110. For example, each time receiver 110 receives a message which includes communication data from bus 40, receiver 110 may store the communication data in buffer 120 after adding information, such as reception frequency and message ID to the communication data in addition to the reception time information. In this way, processor 140 is capable of obtaining the information from buffer 120. Moreover, the analysis information may include a digital signature based on, for example, the identification information of the vehicle. In the analysis information, data conversion, such as compression or encryption, may be performed on the analysis target communication data and the like.

External communicator 141 may transmit the analysis information to the server device by any communication method. For example, in in-vehicle network system 10, the unit of transmission, and transmission timing may be arbitrarily set. For example, external communicator 141 may set one item of communication data and reception time information which indicates the time of reception of the communication data, as one transmission unit of analysis information, and sequentially performs transmission per one or predetermined number of transmission units.

The server device sequentially receives and collects the analysis information, and performs analysis by, for example, statistical processing or multivariate analysis, based on the analysis information. Such an analysis can allow, for example, a verification for whether or not the ADAS function has been executed properly in the vehicle, problems on the security in the in-vehicle network to be detected, and security measures to be designed.

Moreover, as the predetermined processing for analysis, processor 140 may record, on recording medium 150 for recording analysis information, for example, analysis information including analysis target communication data and excluding non-analysis target communication data. The predetermined processing for analysis may be other processing. Other specific examples of the predetermined processing for analysis are described below. One example of the predetermined processing is that processing 140 makes the recording medium store all items of communication data received by receiver 110, and then deletes only the non-analysis target communication data from the recording medium.

Another example of the predetermine processing for analysis is that processor 140 analyzes only the analysis target communication data among the communication data received by receiver 110, by performing information processing such as predetermined analysis calculations or the like, and outputs the analysis result. Another example is that processor 140 analyzes only the analysis target communication data among the communication data received by receiver 110 and determines whether or not each item of the analysis target communication data is in an anomalous state. Processor 140 then causes external communicator 141 to transmit, to the external server device, analysis information related to the analysis target communication data which has an anomalous determination result.

Moreover, another example is that processor 140 determines whether or not the ADAS function related to the predetermined control used for determining the analysis target period is properly operated, based on the analysis target communication data received within the analysis target period among the communication data received and stored in received buffer 120. Only when the determination indicates a negative result, processor 140 may transmit analysis information including the analysis target communication data to the external server device, or records the analysis information on recording medium 150.

Determination of whether or not the ADAS function is properly operated is performed by, for example, similarity judgement in which the feature amount is calculated from the analysis target communication data by a predetermined algorithm and correct data predetermined by analyzing past communication data in a normal state is compared with the calculated feature amount.

[1.4 Operation of Information Processing Device 100]

Figure 5:
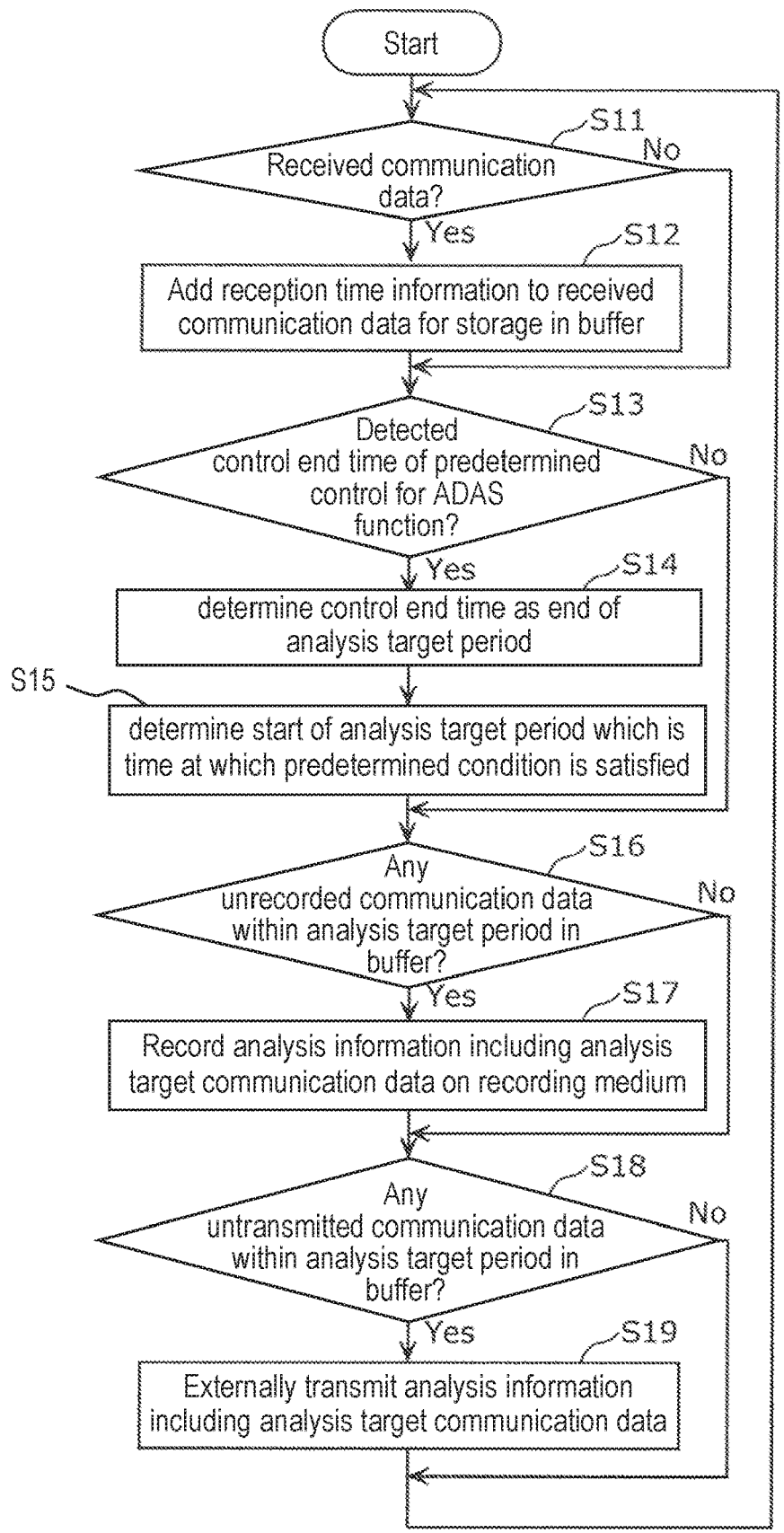
FIG. 5 is a flowchart showing an example of predetermined information processing to be performed by the information processing device according to the first exemplary embodiment.

FIG. 5 is a flowchart of an example of predetermined information processing in information processing device 100. Information processing device 100 performs predetermined information processing illustrated in FIG. 5. Hereinafter, an operational example of information processing device 100 will be described with reference to FIG. 5. Here, an example will be described where receiver 110 receives all the messages communicated via bus 40.

When a message is communicated via bus 40, receiver 110 in information processing device 100 receives the message (Step S11). Receiver 110 adds, for example, reception time information which indicates the time of reception to communication data related to the received message (such as data field content and message ID), and stores the communication data in buffer 120 (step S12). FIG. 6 illustrates an example in which communication data items stored in buffer 120 are arranged in the order of reception.

Moreover, determiner 130 in information processing device 100 repeatedly refers to the content of buffer 120 to check if communication data which indicates the end of predetermined control for the ADAS function is stored. In the case where the communication data indicating the end is stored, determiner 130 detects, by the reception time information, the time at which the message including the communication data is received, and presumes the detected time as the control end time which is the time at which the predetermined control has ended (step S13).

Figure 7:
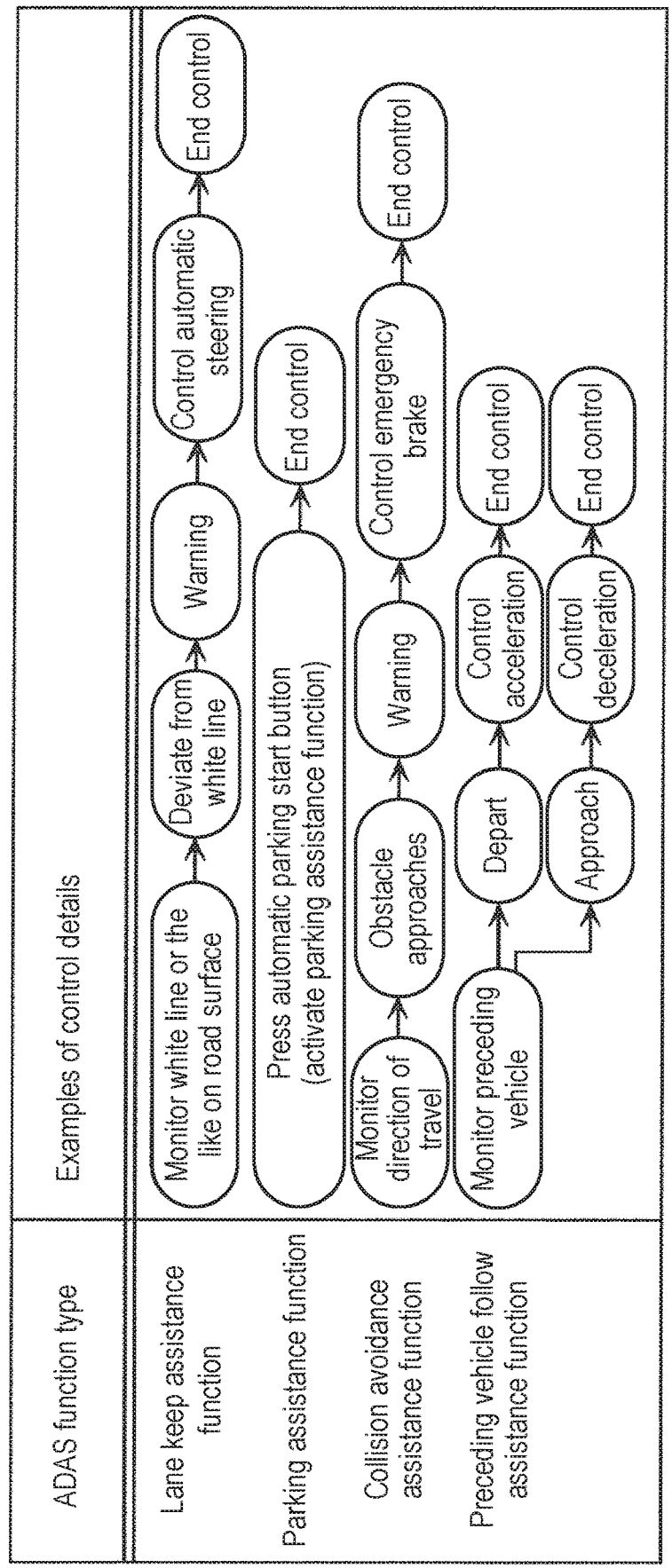
FIG. 7 is a diagram illustrating examples of predetermined control for the functions of ADAS.

FIG. 7 illustrates examples of predetermined control for the ADAS functions. FIG. 8 illustrates examples of the content of the communication data included in messages transmitted from any one of ECUs to bus 40 for predetermined control.

In the vehicle lane keep assistance function illustrated in FIG. 7, when it is determined that the vehicle is deviating from the white line or the like on the road surface, for example, by detecting the state where the angle between the white line and the traveling direction of the vehicle increases, warning sound or the like is emitted, and automatic steering control is performed as predetermined control. The automatic steering control is performed by ECU 20*f* transmitting, to bus 40, a message having a message ID such as "0x011" and including steering angle data. ECU 20*f* transmits, for the automatic steering control, one or more messages each having a steering angle data value which indicates other than 0xFFFF. When the automatic steering control becomes unnecessary, ECU 20*f* starts transmitting a message having a steering angle data value which indicates 0xFFFF.

Accordingly, information processing device 100 detects the time at which the steering angle data corresponding to the message ID indicating "0x011" changes from a value other than 0xFFFF to 0xFFFF by referring to the communication data and the reception time information in buffer 120. Thereby, information processing device 100 is capable of detecting the control end time of the automatic steering control related to the vehicle lane keep assistance function. The detection of the control start time of the automatic steering control related to the vehicle lane keep assistance function can be achieved by detecting the time at which the steering angle data corresponding to the message ID indicating "0x011" changes from 0xFFFF to a value other than 0xFFFF, for example.

In response to detection of the control end time of the predetermined control in step S13, determiner 130 determines the control end time as the end of the analysis target period (step S14). Note that determiner 130 may determine the time after the control end time by a predetermined period (for example, a few seconds) as the end of the analysis target period.

Determiner 130 then determines the start of the analysis target period which is the time at which a predetermined condition is satisfied (step S15). Here, determiner 130 determines a predetermined period from a predetermined analysis target time period table, and determines the start of the analysis target period while considering a predetermined condition is satisfied before the detected control end time of the predetermined control by a predetermined period.

FIG. 9 illustrates an example of the analysis target time period table. The analysis target time period table defines the analysis target period for each of various types of ADAS functions. It is beneficial to prescribe the analysis target period for each of the ADAS functions in the analysis target time period table in view of importance in analysis. Determiner 130 determines, as the above-mentioned predetermined period, the analysis target period for the function corresponding to the predetermined control related to the control end time detected in step S13, among the analysis target period for each of the ADAS functions.

Moreover, processor 140 in information processing device 100 determines whether or not buffer 120 includes communication data received by receiver 110 within the analysis target period and not yet recorded on recording medium 150 (step S16). When the determination indicates a positive result, processor 140 records, on recording medium 150, analysis information including the communication data received within the analysis target period, that is, the analysis target communication data (step S17).

Moreover, processor 140 determines whether or not buffer 120 includes communication data received by receiver 110 within the analysis target period and not yet transmitted (step S18). When the determination indicates a positive result, processor 140 causes external communicator 141 to transmit, to the server device, analysis information including communication data received within the analysis target period, that is, the analysis target communication data (step S19).

In the predetermined information processing, as illustrated in FIG. 5, determination processing in steps S11, S13, S16, and S18 is repeatedly performed. In each of step S16 and step S18, in the determination, if the start and the end of the analysis target period have not yet been determined in steps S14 and S15, negative determination is made.

Moreover, in the determination of each of step S16 and step S18, if the end of the analysis target period has already been determined in step S14, processor 140 treats communication data received before the end as communication data received within the analysis target period, and does not treat the communication data received after the end as communication data received within the analysis target period.

Moreover, in step S17, processor 140 may cause external communicator 141 to transmit, to the server device, analysis information including the analysis target communication data recorded on recording medium 150, and omit step S18 and step S19.

Moreover, in buffer 120, a flag may be added to each item of communication data, and processor 140 may check and update the flag. The flag indicates whether or not the data is recorded or whether or not the data is transmitted.

Moreover, for example, when analysis information corresponding to communication data is transmitted to the server device, or communication data is read from buffer 120 for the transmission, processor 140 may delete the communication data from buffer 120.

[1.5 Advantageous Effects of First Exemplary Embodiment]

In in-vehicle network system 10, among communication data related to the messages transmitted and received by ECU 20*a* to ECU 20*f* via bus 40 in the vehicle, only analysis target communication data classified in relation to the end of the predetermined control for the ADAS function is targeted for processing for analysis. Accordingly, processing for analysis can be efficiently performed.

Information processing device 100 transmits analysis information related to communication data to an external server device having an analyzing function, as processing for analysis of communication performed between the ECUs. In this case, communication data communicated via bus 40 is narrowed down to analysis target communication data received from bus 40 within the analysis target period which ends when predetermined control for the ADAS function ends. The start of the analysis target period is determined by, for example, the analysis target period determined for each ADAS function executed. This narrowing down relatively reduces the amount of data of analysis information transmitted to the server device for analyzing the communication performed in the vehicle. As a result, the communication band required for transmission of analysis information can be reduced relatively.

Moreover, in order to allow analysis to be performed later, information processing device 100 records, on recording medium 150, analysis information related to analysis target communication data among communication data. Accordingly, the amount of data of analysis information recorded on recording medium 150 can be reduced compared to the case where analysis information related to all items of communication data communicated via bus 40 is recorded.

Even in the case where processor 140 performs analysis only on analysis target communication data among communication data received by receiver 110, by performing information processing such as analysis calculation, calculation resources such as the amount of required calculating operations can be reduced compared to the case where all items of communication data are targeted for analysis.

Second Exemplary Embodiment

In the present embodiment, an in-vehicle network system will be described in which in-vehicle network system 10 described in the first exemplary embodiment is partially modified so that an information processing device and an external communication device are included instead of information processing device 100.

In the first exemplary embodiment, the example has been described in which information processing device 100 connected to bus 40 includes external communicator 141 realized by external communication I/F 104 which communicates with a device external to the vehicle. In contrast, in the present embodiment, an example is described in which an information processing device which is a partially modified version of information processing device 100 does not include external communication I/F 104 and the information processing device is linked to an external communication device which is connected to bus 40 includes an external communication I/F similar to external communication I/F 104.

[2.1 Configuration of Information Processing Device 100a and External Communication Device 200]

The in-vehicle network system according to the present embodiment includes information processing device 100a and external communication device 200 which are connected to bus 40. The in-vehicle network system according to the present embodiment is similar to in-vehicle network system 10 (see FIG. 1) described in the first exemplary embodiment in the points which are not particularly mentioned hereinafter.

Figure 10:
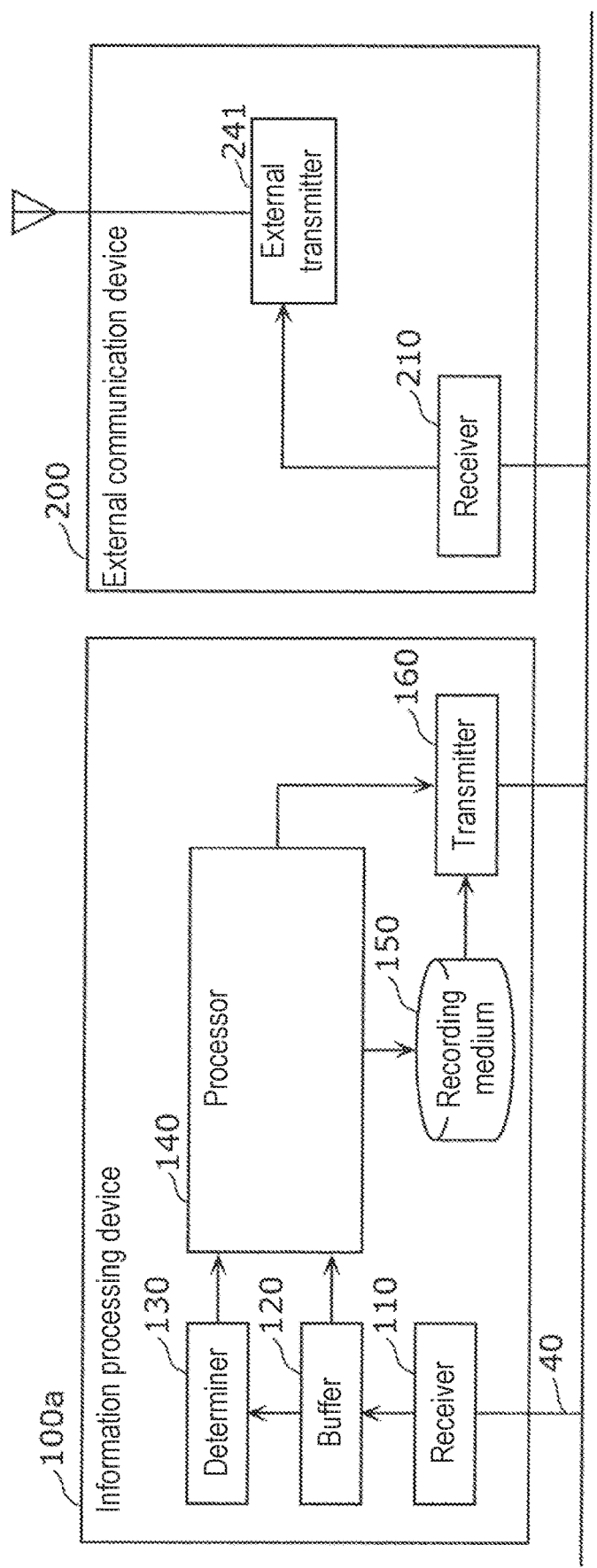
FIG. 10 is a functional block diagram of an information processing device and an external communication device according to a second exemplary embodiment.
Figure 11:
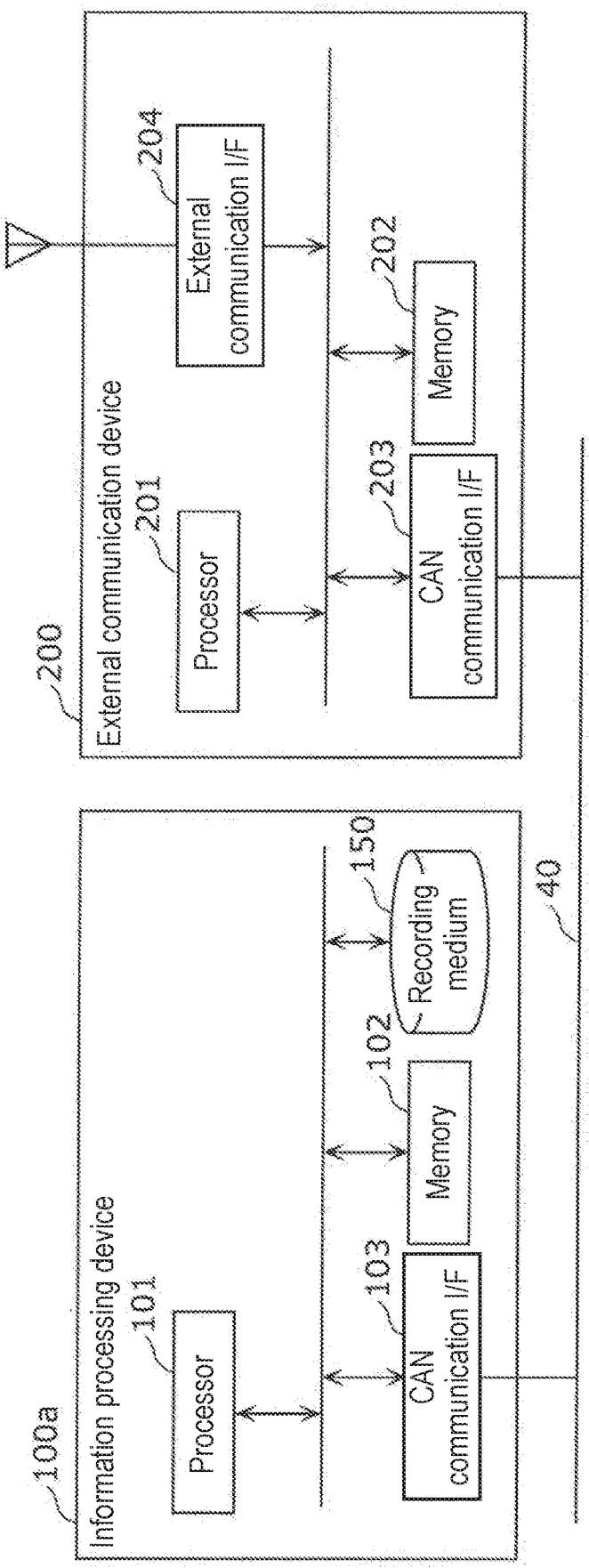
FIG. 11 is a diagram illustrating an example of a hardware configuration of the information processing device and the external communication device according to the second exemplary embodiment.

FIG. 10 is a functional block diagram showing a configuration of information processing device 100a and a configuration of external communication device 200. FIG. 11 illustrates an example of a hardware configuration of information processing device 100a and external communication device 200 according to the present embodiment. As illustrated in FIG. 11, information processing device 100a has a configuration in which external communication I/F 104 is removed from information processing device 100 in the first exemplary embodiment. The structural components of information processing device 100a are approximately the same as the structural components of information processing device 100 in the first exemplary embodiment, and thus, the same reference numbers are used for description. Note that information processing device 100a is similar to information processing device 100 according to the first exemplary embodiment in the points which are not particularly mentioned hereinafter.

External communication device 200 includes, in addition to the hardware configuration of the ECU, a communication circuit for communicating with an external device such as a server device external to the vehicle. In the example of FIG. 11, external communication device 200 includes processor 201, memory 202, CAN communication I/F 203, and external communication I/F 204. For example, external communication device 200 achieves various types of functions as a result of operating of processor 201 in accordance with a program stored in memory 202. As illustrated in FIG. 10, external communication device 200 includes receiver 210 and external transmitter 241 as a functional configuration. Receiver 210 is realized by, for example, CAN communication I/F 203. Receiver 210 receives a message having a predetermined message ID and including analysis information and the like, and notifies external transmitter 241 of the content of the message. External transmitter 241 is realized by external communication I/F 204 and the like, and transmits analysis information to the external server device.

As illustrated in FIG. 10, information processing device 100a includes, as a functional configuration, receiver 110, buffer 120, determiner 130, processor 140, recording medium 150, and transmitter 160. Note that processor 140 is slightly different from that of the first exemplary embodiment in that processor 140 does not include external communicator 141 and does not externally transmit analysis information related to analysis target communication data. Transmitter 160 is realized by CAN communication I/F 103, processor 101 which executes a program, and the like. Under the control of processor 140, transmitter 160 transmits, to bus 40, a message having a predetermined message ID and including analysis information and the like.

Processor 140 in information processing device 100a classifies the communication data received by receiver 110 into analysis target communication data and non-analysis target communication data, and performs predetermined processing for analysis of the analysis target communication data, based on the analysis result. The analysis target communication data is communication data received within the analysis target period determined by determiner 130. The non-analysis target communication data is communication data received outside the analysis target period.

Processor 140 records analysis information on recording medium 150 as predetermined processing for analysis. The analysis information includes analysis target communication data and excludes non-analysis target communication data. Moreover, processor 140 performs predetermined processing for analysis in order to cause the external server device to analyze the analysis target communication data in cooperation with external communication device 200. More specifically, processor 140 controls transmitter 160 to sequentially transmit, to bus 40, messages each having a message ID predetermined so that the messages are received by external communication device 200 and each including analysis information. The analysis information includes the analysis target communication data and excludes non-analysis target communication data among the communication data stored in buffer 120. Transmitter 160 may, for example, include the analysis information recorded on recording medium 150 in the messages. Note that in external communication device 200, receiver 210 sequentially receives the messages including the analysis information, and external transmitter 241 transmits the analysis information to the external server device.

Moreover, as predetermined processing for analysis, processor 140 performs information processing such as an analysis calculation, based on only the analysis target communication data among the communication data stored in buffer 120. Processor 140 then records the analysis target communication data and the analysis result on recording medium 150.

Additionally, processor 140 may cause transmitter 160 to sequentially transmit, to bus 40, messages each having a message ID predetermined so that the messages are received by external communication device 200. Before the transmission, processor 140 includes the analysis result in the messages. In such a case, external communication device 200 sequentially receives the messages each including the analysis result and the like. For example, external communication device 200 causes external communication I/F 204 to transmit, to the external server device, analysis information indicating analysis target communication data which has an anomalous analysis result.

Moreover, processor 140 performs primary analysis based on the analysis target communication data received within the analysis target period among the communication data received and stored in buffer 120. Based on the result of the primary analysis, processor 140 determines whether or not the ADAS function related to the predetermined control used for determining the analysis target period has been properly operated. Only when the determination indicates a negative result, processor 140 causes transmitter 160 to sequentially transmit, to bus 40, messages each having a message ID predetermined so that the messages are received by external communication device 200. Before the transmission, processor 140 includes the analysis information including the analysis target communication data in the messages. Processing may be performed in this manner.

In such a case, external communication device 200 sequentially receives the messages including the analysis information, and causes external communication I/F 204 to transmit the analysis information to the external server device. In buffer 120, a flag which indicates whether or not the primary analysis has been performed may be added to each item of communication data, and processor 140 may check and update the flag. When processor 140 performs primary analysis on each piece of communication data, processor 140 may also delete the communication data from buffer 120, for example. Note that the analysis performed by information processing device 100a is also referred to as primary analysis.

Relative to the transmission of the analysis information to the sever device, a combination of information processing device 100a and external communication device 200 according to the present embodiment functions as one information processing device corresponding to information processing device 100 according to the first exemplary embodiment.

The assignation of processing between information processing device 100a and external communication device 200 may be changed. For example, before the transmission, to bus 40, of the messages each having a message ID predetermined so that the messages are received by external communication device 200, information processing device 100a may include information indicating the analysis target period determined by determiner 130. In such a case, external communication device 200 recognizes the analysis target period by the reception of the messages, classifies the communication data related to the messages received from bus 40 into analysis target communication data received within the analysis target period and non-analysis target communication data received outside the analysis target period, and transmits the analysis information related to the analysis target communication data to the server device.

In this case, external communication device 200 may determine whether or not the analysis target communication data indicates an anomalous state where the ADAS function is not properly operating with respect to a predetermined criterion, and transmit, to the server device, the analysis target communication data indicating the anomalous state and the analysis information including corresponding reception time information and the like.

[2.2 Operation of Information Processing Device 100a]

Figure 12:
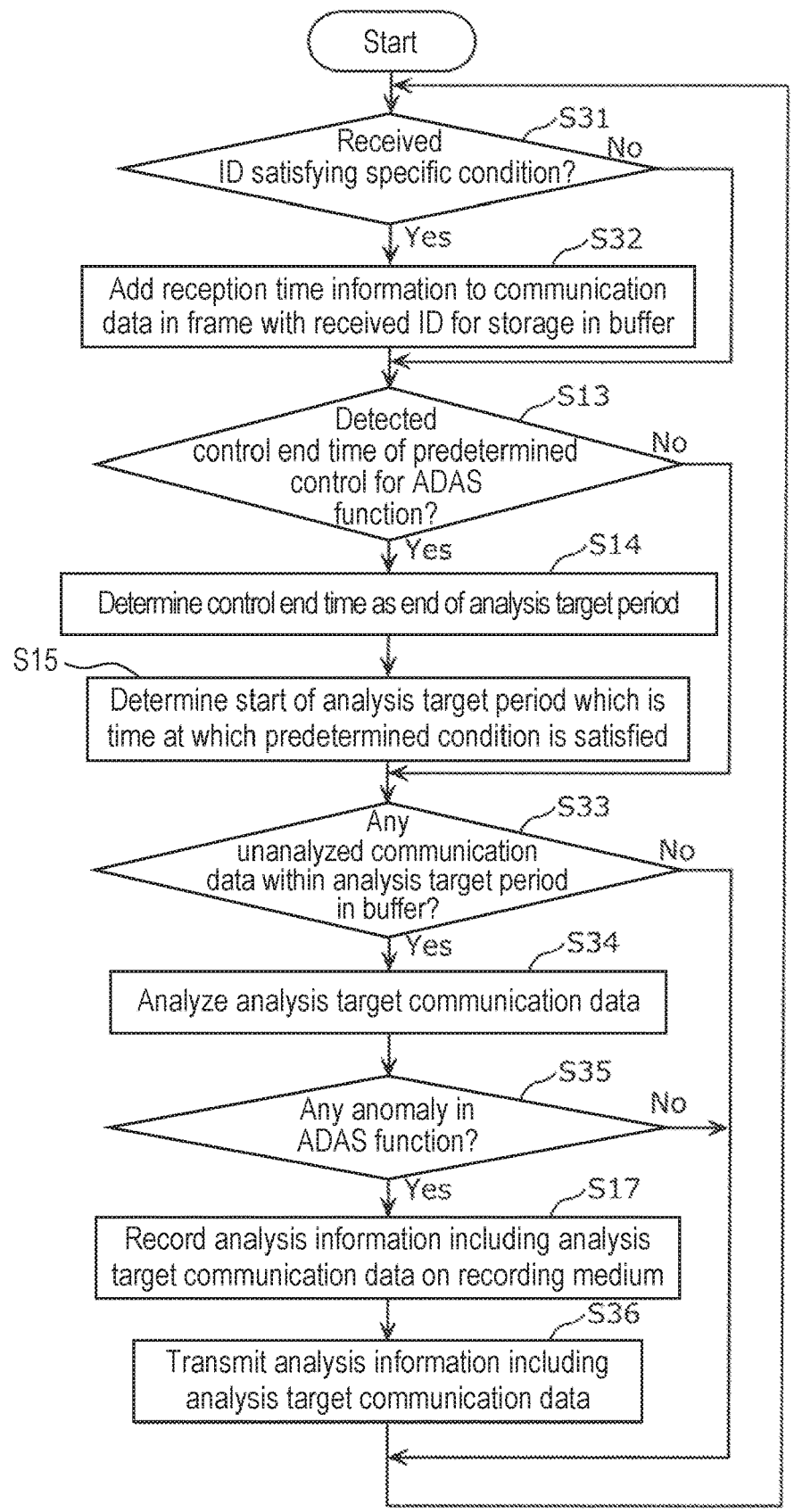
FIG. 12 is a flowchart showing an example of predetermined information processing performed by the information processing device according to the second exemplary embodiment.

FIG. 12 is a flowchart of an example of predetermined information processing in information processing device 100a. In FIG. 12, the steps which are the same as the predetermined information processing illustrated in FIG. 5 are assigned with the reference numbers which are the same as those in FIG. 5, and the descriptions thereof are omitted here. Information processing device 100a performs predetermined information processing illustrated in FIG. 12. Hereinafter, an operational example of information processing device 100a will be described with reference to FIG. 12.

Here, an example will be described where receiver 110 receives only a message having a message ID which satisfies a specific condition among messages communicated via bus 40. Receiver 110 uses a reception ID list which lists message IDs of messages including communication data to be received.

When a message having a message ID included in the reception ID list is communicated via bus 40, receiver 110 of information processing device 100a receives the message (step S31). Receiver 110 adds, for example, reception time information which indicates the time of reception to communication data related to the received message, such as the content of the data field and message ID, and stores the data in buffer 120 (step S32).

Moreover, in information processing device 100a, when buffer 120 includes communication data which indicates the end of predetermined control for the ADAS function, determiner 130 detects the time at which the message including the communication data has been received, and presumes the detected time as the control end time (step S13). Determiner 130 then determines the control end time as the end of the analysis target period (step S14).

It is assumed here that the automatic parking control of the parking assistance function illustrated in the example of FIG. 8 is performed, and ECU 20e transmits, to bus 40, a message having the data value indicating 0xFFFF after transmitting a message having a message ID indicating "0x041" and the steering angle data. Determiner 130 detects the control end time which is the time at which the automatic parking control has ended from a change in data value in the messages of the automatic parking control transmitted from ECU 20e, and determines the detected time as the end of the analysis target period.

Determiner 130 then determines the start of the analysis target period which is the time at which a predetermined condition has been satisfied (step S15). Here, the predetermined condition is satisfied when a predetermined operation that is an operation of an operating interface for instructing activation of the parking assistance function (for example, pressing the automatic parking start button) is performed. For example, determiner 130 detects, from buffer 120, a message transmitted by ECU 20e in response to the pressing of the automatic parking start button, having a message ID indicating "0x041" and including effective steering angle data. By this detection, determiner 130 presumes the time of reception of the message as the predetermined operation time and determines the predetermined operation time as the start of the analysis target period.

Processor 140 of information processing device 100a determines whether or not buffer 120 includes communication data received by receiver 110 within the analysis target period and not yet analyzed (step S33). When the determination indicates a positive result, processor 140 performs primary analysis on the communication data received within the analysis target period, that is, the analysis target communication data (step S34).

Processor 140 may perform primary analysis by any calculations. For example, processor 140 makes determination based on a criterion for determination of whether or not a predetermined anomaly is present, and generates information indicating anomaly or non-anomaly as an analysis result. Herein, the primary analysis will be described in which whether or not the ADAS function has been properly performed is determined.

Subsequently, when processor 140 determines by the primary analysis that the ADAS function has not been properly operated, that is, an anomaly is present (step S35), processor 140 records, on recording medium 150, analysis information including analysis target communication data (step S17). Processor 140 then causes transmitter 160 to transmit one or more messages indicating analysis information including the analysis target communication data to bus 40 in accordance with the CAN protocol (step S36).

Accordingly, for example, external communication device 200 receives the message by receiver 210, and transmits analysis information to the external server device. When processor 140 determines in step S35 that the ADAS function has been properly operated, processor 140 skips the processing in steps S17 and S36. Moreover, when the determination indicates a negative result in S33, processor 140 skips the processing in steps S34 to S36.

In the predetermined information processing, as illustrated in FIG. 12, determination processing in steps S31, S13, and S33 are repeatedly performed. In the determination in step S33, a negative determination is made if the start and the end of the analysis target period have not yet been determined in steps S14 and S15.

Moreover, in the determination of step S33, if the end of the analysis target period has already been determined in step S14, processor 140 treats communication data received before the end as communication data received within the analysis target period, and does not treat communication data received after the end as communication data received within the analysis target period.

[2.3 Advantageous Effects of Second Exemplary Embodiment]

In-vehicle network system 10 according to the present embodiment, in a vehicle including ECU 20e and the like which perform predetermined control related to the ADAS function, among the communication data related to the messages received and transmitted via bus 40 by ECUs 20a to 20f, only the analysis target communication data classified in relation to the end of the predetermined control is targeted for processing for analysis. By the predetermined information processing illustrated in FIG. 12, information processing device 100a sequentially obtains, from bus 40, communication data included in messages each having a specific message ID listed in the reception ID list. Among the communication data obtained, only the communication data within the analysis target period is targeted for primary analysis and the like. Subsequently, as the result of the primary analysis, the analysis target communication data is limited to anomalous data, and the limited analysis information is recorded on recording medium 150 and is presumed to be transmitted. This is because information related to anomaly of the ADAS function can be relatively important information as a target for analysis for development of automatic driving technique including ADAS, securing security, and the like. Accordingly, information processing device 100a is capable of efficiently performing processing for analysis of communication data related to important information by predetermined information processing.

Other Embodiments

As described above, the first and second exemplary embodiments have been described as examples of the technique according to the present disclosure. However, the technique according to the present disclosure is not limited to such embodiments, but is applicable to another embodiment in which a change, a replacement, an addition, an omission, and the like are appropriately made. For example, the following modifications are also included in aspects of the present disclosure.

(1) In the above embodiments, it has been described that the information processing device determines whether or not the ADAS function has been properly operated, based on correct data. This correct data may additionally include information for specifying the details of comparison processing, such as a message ID related to the communication data to be compared, the range of the reception time of the communication data to be compared, or similarity determining method. In this case, it is determined whether or not the ADAS function has been properly operated, by comparing the feature amount of the analysis target communication data with the correct data in accordance with the processing details specified by information added to the correct data.

(2) In the above embodiments, as a format of the data frame in accordance with the CAN protocol, the standard ID format (see FIG. 2) is used. Alternatively, an extended ID format may be used, and the ID in the data frame (that is message ID) may be, for example, an extended ID in the extended ID format.

Furthermore, the CAN protocol described in the above embodiments may include, in a broad sense, derivative protocols such as Time-Triggered CAN (TTCAN), and CAN with Flexible Data Rate (CANFD). Furthermore, the network used to perform communication between the ECUs in a vehicle is not limited to a network in accordance with the CAN protocol. Another network may be used. Examples of a protocol, other than the CAN, used in a network over which the ECUs transmit and receive communication data include Ethernet (registered trademark), Local Interconnect Network (LIN), Media Oriented Systems Transport (MOST) (registered trademark), FlexRay (registered trademark), and BroadR-Reach protocol.

(3) Each ECU in the above embodiments is a device which includes, for example, a digital circuit such as a processor and a memory, an analog circuit, and a communication circuit, but each ECU may further include other hardware components such as a hard disk device and a display. Furthermore, the function of each device described in the above embodiments may be implemented by dedicated hardware (such as a digital circuit) rather than by software that causes the processor to execute the program stored in the memory.

(4) The functional assignment of the respective functional blocks of information processing devices 100 and 100a in the embodiments is merely an example, and the assignment may be changed as appropriate.

(5) The execution order of various processing in the above embodiments (for example, order of the steps in FIG. 5 and FIG. 12) is not necessarily limited to the above-described order. Modifications may be made without departing from the gist of the present disclosure, such as a change of the execution order of the steps, parallel execution of the steps, or omission of some of the steps.

(6) A part or all of the structural components of each of the devices in the above embodiments may be configured from a single system large scale integration (LSI). The system LSI is a super multi-functional LSI manufactured so that a plurality of units are integrated into a single chip, and specifically, is a computer system including a microprocessor, a ROM, a RAM, and the like. A computer program is stored in the RAM. The system LSI achieves its functions as a result of the microprocessor operating in accordance with the computer program.

Furthermore, each of the elements of the devices may be individually integrated into one chip or may be entirely or partially integrated into one chip. Although the term LSI is used here, the LSI may also be called an integrated circuit (IC), an LSI, a super LSI, or an ultra LSI depending on the degree of integration. The circuit integration technique is not limited to LSIs, but may be realized by dedicated circuits or a general-purpose processor. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(7) A part or all of the structural components included in each of the above-described devices may be implemented as an IC card or a stand-alone module that can be inserted into and removed from the corresponding devices. Each of the IC card and the module is a computer systems configured with a microprocessor, a ROM, and a RAM, and so forth. Each of the IC card and the module may include the above-described super multi-functional LSI. Each of the IC card and the module functions as a result of the operation of the microprocessor in accordance with the computer program. The IC card or the module may be tamper resistant.

(8) One aspect of the present disclosure may be an information processing method that includes all or part of the processing steps illustrated in FIG. 5, FIG. 12, and the like. For example, the information processing method is used in an information processing device that is mounted to the vehicle. The information processing device collects information used for analyzing communication performed between a plurality of ECUs in the in-vehicle network. The ECUs include an ECU which performs, on the vehicle, predetermined control related to the ADAS function. The information processing method includes a receiving step (for example, step S11 and step S31), a determining step (for example, steps S13 to S15), and a processing step (for example, steps S17, S19, S34, and S36). In the receiving step, a plurality of items of communication data sequentially transmitted over the in-vehicle network are received. In the determining step, a control end time which is the time at which a predetermined control ends is detected to determine an analysis target period including the control end time. In the processing step, the items of the communication data received in the receiving step are classified into analysis target communication data received within the analysis target period and non-analysis target communication data received outside the analysis target period. Furthermore, predetermined processing for analysis of the analysis target communication data is performed based on the classification result.

Moreover, one aspect of the present disclosure may be provided as a program (computer program) that causes a computer to execute predetermined information processing related to the information processing method. Or, one aspect of the present disclosure may be provided as digital signals of the program.

Furthermore, one aspect of the present disclosure may be provided as a computer readable recording medium that contains the computer program or the digital signals. Examples of the computer readable recording medium include a flexible disk, a hard disk, a CD-ROM, a magneto-optical (MO) disc, a digital versatile disc (DVD), a digital versatile disc read-only memory (DVD-ROM), a digital versatile disc random access memory (DVD-RAM), a Blu-ray disc (registered trademark) (BD), and a semiconductor memory.

In addition, the present disclosure may be implemented by using the digital signals recorded on those recording media. One aspect of the present disclosure may include a configuration in which the program or the digital signals are transmitted over a telecommunications line, a wireless or wired communication line, a network represented by the Internet, data broadcasting, and the like.

Furthermore, one aspect of the present disclosure may be a computer system including a microprocessor and a memory. The memory may store the computer program, and the microprocessor may operate in accordance with the computer program. Moreover, by transferring the storage medium having the aforementioned program or digital signal recorded thereon or by transferring the aforementioned program or digital signal via the aforementioned network or the like, the present disclosure may be implemented by a different independent computer system.

(9) Forms obtained by arbitrarily combining the structural elements and functions described in the above exemplary embodiments and modified examples are also included in the scope of the present disclosure.

As described above, an information processing device according to one aspect of the present disclosure collects information used for analyzing communication performed between a plurality of ECUs in an in-vehicle network. The ECUs include an ECU which performs, on a vehicle, predetermined control related to a function of the ADAS. The information processing device includes a receiver, a determiner, and a processor. The receiver receives a plurality of items of communication data sequentially transmitted over the in-vehicle network. The determiner detects the control end time which is the time at which the predetermined control ends and determines an analysis target period including the control end time. The processor classifies the plurality of items of communication data received by the receiver into analysis target communication data received within the analysis target period and non-analysis target communication data received outside the analysis target period. The processor further performs predetermined processing for analysis of the analysis target communication data based on the classification result. Accordingly, an increase in amount of resources required for processing for analysis of information related to communication performed between the ECUs in the vehicle can be reduced. For example, types of data useful for analysis as communication data can be determined. Moreover, the predetermined processing may be of distinguishing analysis target communication data from non-analysis target communication data. For example, the predetermined processing may be processing for deleting only non-analysis target communication data among communication data received by the receiver and recorded on the recording medium, or processing in which analysis target communication data is analyzed and non-analysis target communication data is not analyzed.

Moreover, for example, the determiner may detect the control end time based on the communication data received by the receiver, and determine the analysis target period so as to include the period from the time at which a predetermined condition has been satisfied before the control end time to the control end time. For example, if the communication data received by the receiver indicates the end of the predetermined control, the time of reception serves as the control end time. The predetermined condition may be satisfied, for example, (i) when communication data indicating predetermined information is received, (ii) when a predetermined vehicle state is detected, or (iii) when a certain amount of communication data starts to be received before the control end time. Accordingly, processing for analysis can be efficiently performed by appropriately determining the predetermined condition in combination with the predetermined control in view of importance of communication data in the analysis.

Moreover, for example, the determiner may determine the analysis target period so that the control end time is the end of the analysis target period and the time at which the predetermine condition has been satisfied before the control end time as the start of the analysis target period. Accordingly, information of the communication performed between the ECUs before the control end time which is the time at which the predetermined control ends can be targeted for processing for analysis. Hence, compared to the case where information of the communication performed after the control end time is also used as a processing target, the amount of resources required for the processing can be reduced.

Moreover, for example, the information processing device may include a buffer which is capable of storing communication data received by the receiver. In this case, the receiver adds reception time information to the received communication data and stores the data with reception time information in the buffer. The reception time information indicates the time of reception of the communication data. Moreover, the determiner determines the analysis target period by determining the time at which a predetermined condition has been satisfied, based on the communication data and the reception time information stored in the buffer. The processor classifies the communication data stored in the buffer. Accordingly, by using the communication data and the reception time information stored in the buffer, it is possible to appropriately extract the communication data which is received during the period from the time at which the predetermined condition has been satisfied to the control end time and is targeted for predetermined processing.

Moreover, for example, the determiner may detect the control start time which is the time at which predetermined control has started, based on the communication data and the reception time information stored in the buffer, and determine the control start time as the time at which the predetermined condition has been satisfied. Accordingly, information of the communication performed between the ECUs during the period from when the predetermine control related to the ADAS function starts till when the predetermined control ends, can be targeted for processing for analysis. Hence, the target for processing for analysis can be narrowed down to information related to messages of relatively high importance in view of the verification of the ADAS functions, security measures, and the like. As a result, processing for analysis can be efficiently performed.

Moreover, the determiner may detect a predetermined operation time at which a predetermined operation has been performed on a vehicle by an occupant of the vehicle, based on the communication data and the reception time information stored in the buffer, and determines the predetermined operation time as the time at which the predetermined condition has been satisfied. The predetermined operation is, for example, an operation for instructing start of predetermined control related to the ADAS function, such as an operation of an operating interface for instructing activation of the parking assistance function. It is beneficial to appropriately determine the predetermined operation in advance. Accordingly, information of the communication performed between the ECUs during the period from when a predetermined operation is made till when the predetermined control related to the ADAS function, such as the parking assistance function, ends can be targeted for processing for analysis.

Moreover, for example, the ADAS function related to the predetermined control may be a specific ADAS function among a plurality of functions including at least one of the parking assistance function, the lane keep assistance function, the collision avoidance assistance function, and the preceding vehicle follow assistance function. In this case, the predetermined control is control of an actuator of the vehicle. The determiner detects, as the control end time, the time at which the receiver has received the communication data indicating the end of the predetermined control. The predetermined condition is satisfied before the control end time by a predetermined period set for the specific ADAS function of the ADAS functions among predetermined periods set for the ADAS functions. Control may be performed in this way. Accordingly, for example, the information of the communication performed between the ECUs during a predetermined period (for example, a few seconds or a few tens of seconds) before the end of the control of the actuator of the vehicle related to the ADAS function can be targeted for processing for analysis. Examples of the ADAS function include the parking assistance function, the lane keep assistance function, the collision avoidance assistance function, and the preceding vehicle follow assistance function. The predetermined period is set for each function. Hence, it is possible to efficiently analyze communication data of relatively high importance, by appropriately setting a predetermined period for each of the ADAS functions.

Moreover, for example, the processor may transmit analysis information to outside the vehicle as predetermined processing, in order to cause a device external to the vehicle to analyze the analysis target communication data. The analysis information includes analysis target communication data and excludes non-analysis target communication data. Accordingly, for example, analysis information, such as communication data, to be transmitted to an external device having an analyzing function or the like can be narrowed down to information related to the analysis target communication data. Hence, it is possible to reduce the communication band required for transmission, compared to the case where no narrowing is performed. This allows information related to the communication performed in the in-vehicle network to be efficiently analyzed by an external device.

Moreover, for example, the processor may determine whether or not the ADAS function related to the predetermined control has been properly operated, based on the analysis target communication data. Only when the determination indicates a negative result, the processor may transmit the analysis information. Accordingly, the communication data transmitted and received between the ECUs can be narrowed down to the analysis target communication data transmitted and received when the ADAS function has been improperly operated, and analysis information related to the narrowed down analysis target communication data is transmitted. Hence, the communication band required for the transmission can be reduced, leading to an efficient analysis.

Moreover, for example, as the predetermined processing, the processor may record analysis information including analysis target communication data and excluding non-analysis target communication data, on a predetermined recording medium for recording analysis information used for analyzing the analysis target communication data. Accordingly, the analysis information such as communication data to be recorded on the recording medium can be narrowed down to information related to the analysis target communication data. Hence, the amount of data recorded on the recording medium in a unit of time can be reduced compared to the case where no narrowing is performed. As a result, an increase in capacity of the recording medium required for recoding for analysis is suppressed.

Moreover, for example, a plurality of ECUs may transmit and receive frames including communication data via a bus in accordance with the CAN protocol, the information processing device may be connected to the bus, and the receiver may sequentially receive the frames including the communication data from the bus. Accordingly, it is possible to reduce the amount of resources required for processing for analysis of information related to the transmission and reception of the frames via the bus between the ECUs in the vehicle.

Moreover, for example, the receiver may receive, as the communication data, the content of the data field of the data frame in which the content of the ID field satisfies a specific condition. For example, among the data types defined in the in-vehicle network system, a specific message ID corresponding to a specific type of data useful for analysis can be determined so as to satisfy a specific condition. Accordingly, the processing target can be narrowed down by temporally classifying the communication data having limited content by using the determined analysis target period. Hence, processing for analysis can be efficiently performed.

An information processing method according to one aspect of the present disclosure is used in an information processing device mounted to a vehicle. The information processing device collects information used for analyzing communication performed between a plurality of ECUs in an in-vehicle network. The ECUs include an ECU which performs, on the vehicle, predetermined control related to the ADAS function. In the information processing method, first, a plurality of items of communication data sequentially transmitted over the in-vehicle network are received. Next, control end time which is the time at which the predetermined control ends is detected to determine an analysis target period including the control end time. The plurality of items of communication data received are classified into analysis target communication data received within the analysis target period and non-analysis target communication data received outside the analysis target period. Furthermore, predetermined processing for analysis of the analysis target communication data is performed based on the classification result. Accordingly, an increase in amount of resources required for processing for analysis of information related to the communication performed between the ECUs in the vehicle can be suppressed.

Moreover, a program according to one aspect of the present disclosure causes an information processing device mounted to the vehicle and including a microprocessor to perform information processing. The information processing device collects information used for analyzing communication performed between a plurality of ECUs in an in-vehicle network. The ECUs include an ECU which performs, on the vehicle, predetermined control related to the ADAS function. The program includes receiving, determining, classifying, and performing. In the receiving, a plurality of items of communication data sequentially transmitted over the in-vehicle network are received. In the determining, the control end time which is the time at which the predetermined control ends is detected to determine an analysis target period including the control end time. In the classifying, the plurality of items of communication data received are classified into analysis target communication data received within the analysis target period and non-analysis target communication data received outside the analysis target period. In the performing, predetermined processing for analysis of the analysis target communication data is performed based on the classification result. By installing the program on the information processing device, predetermined information processing is performed as a result of the microprocessor of the information processing device executing the program. Accordingly, an increase in amount of resources required for processing for analysis of information related to the communication performed between the ECUs in the vehicle can be suppressed.

These general or specific aspects may be realized as a system, a method, an integrated circuit, a computer program, or a computer readable recording medium such as a CD-ROM, or any given combination of the system, the method, the integrated circuit, the computer program and the recording media. In other words, a non-transitory recording medium according to one aspect of the present disclosure stores the above program.

The present disclosure can be used in, for example, an in-vehicle network system of a vehicle having ADAS functions.

What is claimed is:
1. An information processing device, comprising:
   a receiver which, in operation, receives a plurality of items of communication data from an in-vehicle network to which a plurality of electronic control units (ECUs) is connected, the plurality of ECUs being configured to perform control related to a plurality of automatic driving functions on a vehicle;
   a processor which, in operation:
      detects a control end time of performed control related to one of the plurality of automatic driving functions;
      determines an analysis target period that is from a start time to an end time, inclusive, the end time being the control end time, the start time being a predetermined time length before the end time, the predetermined time length being dependent on the one of the plurality of automatic driving functions;
      classifies the plurality of items of communication data into analysis target communication data and non-analysis target communication data, the analysis target communication data being items of the plurality of items of communication data which are received within the analysis target period, the non-analysis target communication data being items of the plurality of items of communication data which are received outside the analysis target period; and performs predetermined processing of the analysis target communication data.

2. The information processing device according to claim 1, further comprising:

a buffer which is configured to store the plurality of items of communication data received by the receiver, wherein the receiver makes the buffer store the plurality of items of communication data after adding reception time information to the plurality of items of communication data, the reception time information indicating a time of reception of each of the plurality of items of communication data received, the processor determines the analysis target period based on the plurality of items of communication data and the reception time information stored in the buffer, and the processor classifies the plurality of items of communication data stored in the buffer into the analysis target communication data received within the analysis target period and the non-analysis target communication data received outside the analysis target period.

3. The information processing device according to claim 1, wherein the plurality of automatic driving functions includes at least one of a parking assistance function, a lane keep assistance function, a collision avoidance assistance function, and a preceding vehicle follow assistance function, the control is control of an actuator of the vehicle, and in response to an end of the control indicated by one of the plurality of items of communication data received by the receiver, the processor detects, as the control end time, a time of reception of the one of the plurality of items of communication data.

4. The information processing device according to claim 1, wherein the processor transmits analysis information to outside the vehicle as the predetermined processing, the analysis information including the analysis target communication data and excluding the non-analysis target communication data.

5. The information processing device according to claim 4, wherein the processor determines whether or not the one of the plurality of automatic driving functions is properly operated, based on the analysis target communication data, and transmits the analysis information in response to a determination being made by the processor that indicates a negative result.

6. The information processing device according to claim 1, wherein the processor records analysis information on a predetermined recording medium as the predetermined processing, the recording medium being for recording the analysis information and used for analyzing the analysis target communication data, the analysis information including the analysis target communication data and excluding the non-analysis target communication data.

7. The information processing device according to claim 6, wherein the processor determines whether or not the one of the plurality of automatic driving functions is properly operated, based on the analysis target communication data, and records the analysis information in response to a determination being made by the processor that indicates a negative result.

8. The information processing device according to claim 1, wherein the information processing device is connected to a bus via which the plurality of ECUs transmit and receive a frame including the plurality of items of communication data in accordance with a controller area network protocol, and the receiver receives the frame including the plurality of items of communication data from the bus.

9. The information processing device according to claim 8, wherein the receiver receives contents of data fields included in data frames as the plurality of items of communication data, each of the data frames having an ID field with content satisfying a specific condition.

10. An information processing method, comprising:

receiving a plurality of items of communication data from an in-vehicle network to which a plurality of electronic control units (ECUs) is connected, the plurality of ECUs being configured to perform control related to a plurality of automatic driving functions on a vehicle;

detecting a control end time of performed control related to one of the plurality of automatic driving functions;

determining an analysis target period that is from a start time to an end time, inclusive, the end time being the control end time, the start time being a predetermined time length before the end time, the predetermined time length being dependent on the one of the plurality of automatic driving functions;

classifying the plurality of items of communication data into analysis target communication data and non-analysis target communication data, the analysis target communication data being items of the plurality of items of communication data which are received within the analysis target period, the non-analysis target communication data being items of the plurality of items of communication data which are received outside the analysis target period; and performing predetermined processing of the analysis target communication data.

11. A non-transitory recording medium storing a program for causing an information processing device, including a microprocessor and being mounted to a vehicle, to perform information processing, the information processing comprising:

receiving a plurality of items of communication data from an in-vehicle network to which a plurality of electronic control units (ECUs) is connected, the plurality of ECUs being configured to perform control related to a plurality of automatic driving functions on a vehicle;

detecting a control end time of performed control related to one of the plurality of automatic driving functions;

determining an analysis target period that is from a start time to an end time, inclusive, the end time being the control end time, the start time being a predetermined time length before the end time, the predetermined time length being dependent on the one of the plurality of automatic driving functions;

classifying the plurality of items of communication data into analysis target communication data and non-analysis target communication data, the analysis target communication data being items of the plurality of items of communication data which are received within the analysis target period, the non-analysis target communication data being items of the plurality of items of communication data which are received outside the analysis target period; and performing predetermined processing of the analysis target communication data.

* * * * *